(No Model.)
R. L. FOSBURGH & J. F. MILLIGAN.
BRAKE HANDLE.
No. 469,401. Patented Feb. 23, 1892.
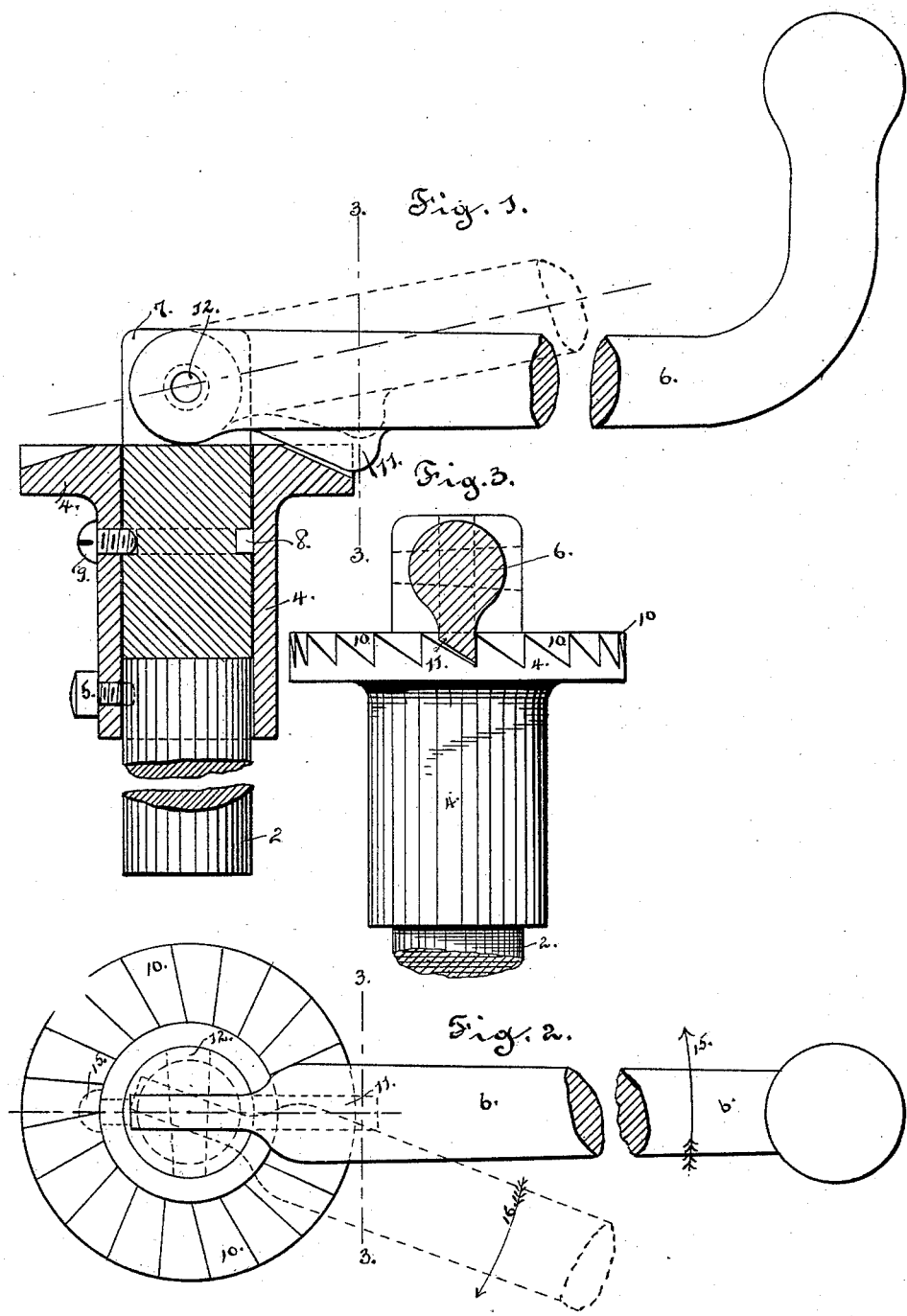

United States Patent Office.

ROBERT L. FOSBURGH AND JOHN F. MILLIGAN, OF ST. LOUIS, MISSOURI.

BRAKE-HANDLE.

SPECIFICATION forming part of Letters Patent No. 469,401, dated February 23, 1892.

Application filed June 8, 1891. Serial No. 395,609. (No model.)

*To all whom it may concern:*

Be it known that we, ROBERT L. FOSBURGH and JOHN F. MILLIGAN, citizens of the United States, residing in the city of St. Louis and State of Missouri, have invented certain new and useful Improvements in Brake-Handles, of which the following is a full, clear, and exact description.

Our invention relates to ratchet-brake handles, and has for its object the production of a simple one-way ratchet-brake handle adapted to be applied to the ordinary brake-handle shaft without materially modifying the brake-handle shaft as at present used; and it consists in the hereinafter-described mechanism, as a handle-head piece, as applied to the brake-handle shaft.

In the accompanying drawings, in which like figures of reference denote like parts in the several views, Figure 1 is a vertical section taken centrally through our improved ratchet-head piece, as on the line 1 1 in Fig. 2, as secured to the upper end of the brake-handle shaft, showing in dotted lines a vertically-changed position of the handle-piece proper, as is necessary to allow the same to slide over the inclined ratchet-teeth in the independent revolution of the handle, as hereinafter described. Fig. 2 is a plan view of the same, showing in dotted lines a change in position, as hereinafter described, of the independently-revoluble handle portion of the ratchet-head piece; and Fig. 3 is a side elevation, partially in section, as taken on the line 3 3 in Figs. 1 and 2.

2 is the upper end of the brake-shaft.

4 is a disk-plate formed with inclined ratchet-teeth 10 in the upper edge thereof, as shown in Figs. 1, 2, and 3. The body of 4 is formed as a sleeve, which is fitted and rigidly secured to the upper end of the brake-shaft 2 by any preferable means, as a clamping-screw 5 in Fig. 1.

As shown in Figs. 1, 2, and 3, the brake-handle 6 is pivotally secured by a pin 12 in a slot formed in one end of cylindrically-formed plug-piece 7, which is revolubly fitted into the central portion of the ratchet-disk piece 4, which in this instance projects beyond the end of the ratchet-brake shaft 2 and is retained therein by having a circumferential groove 8 cut in the plug 7 and a set-screw 9 let through the material of the sleeve portion of the ratchet-disk piece 4, as shown in Fig. 1. The under side of the handle 6 at a distance from the center of the pivotal plug 7 corresponding with the radial position of the ratchet-teeth 10 is so formed as to adapt it in the operation of the handle, as hereinafter described, as a pawl to engage the ratchet-teeth 10. This is preferably done, as shown in Fig. 3, by forming the shoulder of projection 11 on the under side of the handle 6.

The operation of the handle is as follows: As will be seen from the drawings and from the description, the handle 6 is revoluble independently of the ratchet-disk head-piece 4, and therefore the brake-shaft 2, to which the ratchet-disk is rigidly secured, except when the handle is depressed to a position forcing the pawl-shoulder 11 on the handle 6 into engagement with the ratchet-teeth 10, as shown in full lines in Figs. 1 and 3. When in this relative position, the ratchet-head 4 and brake-shaft 2 will be revolved with the handle 6 in one direction, in the direction of the arrow 15 in Fig. 2. This revolution of the brake-shaft will tighten the brake. When it is desired to get a new bite, the ordinary foot-ratchet (not shown) is used to retain the brake-shaft and the handle 6 revolved in the reverse direction, that of the arrow 16 in Fig. 2. In this instance the pawl-shoulder 11 on the handle 6 will slip over the inclined ratchet-teeth 10 in the manner as indicated in dotted lines in Fig. 1. When it is desired to loosen the brake, the handle is given a forward push just enough to disengage the foot-ratchet on the brake-shaft, and then the handle 6 is simply raised to the position shown in dotted lines in Fig. 1, which disengages the pawl-shoulder 11 from the ratchet-teeth 10, releasing the ratchet-disk and allowing the brake-chain to unwind.

One of the principal advantages of our improved handle and its consequent method of operation is in the release of the brake, as explained, in which in the unwinding movement of the brake-shaft the handle remains independently stationary.

Its simplicity and its adaptability to be applied to already existing brake-shafts by merely securing the ratchet-disk 4 and the pivot-bearing 7, with attached handle 6, are among the novel features claimed to be of practical utility.

It is obvious from the construction of our device that it is possible to form the ratchet-teeth 10 in the upper end of the brake-shaft itself, perhaps flaring it out radially for that purpose, and the pivotal bearing 7 let into a recess formed therein without departing from the essential features of our invention.

We claim—

1. In ratchet-brake handles, brake-shaft 2, head-piece 4, ratchet-teeth 10, pivotal bearing 7, handle 6, and pawl-shoulder 11, combined and operating substantially as described, and for the purposes specified.

2. In ratchet-brake handles, brake-shaft 2, head-piece 4, ratchet-teeth 10, pivotal bearing 7, set-screw 9, handle 6, pivot-pin 12, and pawl-shoulder 11, combined and operating substantially as described, and for the purposes specified.

In testimony whereof we have affixed our signatures, in presence of two witnesses, this 13th day of May, 1891.

ROBERT L. FOSBURGH.
JOHN F. MILLIGAN.

Witnesses:
JOS. W. CROOKES,
A. RAMEL.